3,748,319
PROCESS FOR MANUFACTURING UREA-FATTY SUBSTANCE INCLUSION COMPOUNDS

Glenn E. Tolle and Edwin G. Marhofer, Pittsburg, Kans., assignors to Gulf Oil Corporation, Pittsburgh, Pa.
No Drawing. Filed Dec. 6, 1971, Ser. No. 205,333
Int. Cl. C07b *21/00;* C07c *127/00*
U.S. Cl. 260—96.5                                   2 Claims

ABSTRACT OF THE DISCLOSURE

The process for manufacturing inclusion compounds of urea and fatty substances in an aqueous medium is improved by use of a slurry instead of a solution of urea and performing all of the steps at ambient temperature so as to improve the speed of reaction and reduce heat requirements.

DESCRIPTION OF THE INVENTION

Inclusion compounds of urea with fatty acids and various oil-soluble substances such as certain vitamins have been disclosed to be desirable components of animal feeds. The method of forming the inclusion compound ordinarily involves the use of a solution of urea in water or methanol with sufficient heat so that the fatty substance melts, permitting efficient mixing of the reactants. Representative methods may be found, for example, in U.S. Pat. 2,875,060, U.S. Pat. 2,578,054 and German Pat. 869,070. In the past most of the processes for formation of urea inclusion compounds have been designed to produce small quantities or to form the inclusion compound only as an incident to a process for separating components of oily or greasy mixtures. In manufacturing a urea inclusion compound to be dried, packaged and sold as a feed supplement, the residence time in the manufacturing equipment and the amount of heat necessary in the process become critically important items of expense. Although heating greatly facilitates intimate mixing of the reactants, elevated temperatures actually interfere with formation of the desired product. It therefore often becomes necessary to both heat and cool during manufacturing in order to obtain a sufficiently high throughput rate in the equipment. We have discovered that a much simpler procedure may be used and that steps employed in the past are not only unnecessary but may advantageously be omitted. The improved process for manufacturing urea inclusion compounds of fatty substances comprises the following steps performed in sequence:

(a) mixing urea with sufficient water at ambient temperature to form a slurry but not sufficient to cause the major part of the urea to dissolve,
(b) mixing under shearing conditions one part by weight of fatty substance with a quantity of slurry from step (a) containing from 2.5 to 5.5 parts of urea for a time sufficient to form the solid urea inclusion compound, and
(c) drying the product of step (b) in a stream of air, said steps (a) and (b) being performed without addition of heat to the process. The process is described in detail with illustrative examples in the discussion which follows:

Forming the urea slurry

The amount of urea employed in formation of the aqueous slurry should be between 75 percent and 85 percent by weight. Although as much as 95 percent urea may be used, it is found that the resulting product often contains unreacted crystalline urea. In most instances this reduces the value per unit weight and desirability of the finished product. If less than 75 percent urea is employed the product will contain more water than is desirable. Although the quality of the product is unaffected by the excess water, considerable unnecessary expense is required to dry the product. Preferably, about 80 percent urea by weight is employed in forming the slurry. This slurry contains sufficient water to provide a reaction medium for the process and the product is readily broken apart and exposed to air in the drying step.

Mixing the fatty substance with the urea slurry

The urea slurry having been formed at ambient temperature should not be warmed for the mixing step, but preferably is mixed with the fatty acid or fatty ester under shearing conditions without heating in order to speed the precipitation of the solid adduct product. In this step, since only a matter of minutes is required to carry it out, sufficient heat is retained so as to aid materially in drying the product.

Drying the product

Preferably, the damp solid product is stirred or broken up so as to give it a damp, mealy consistency and aid in removal of water in a current of air. Conventional drum drying equipment in which the product moves continuously as a rolling bed may be used in this step. Operation of the process is specifically exemplified below.

EXAMPLE 1

In a specific procedure 12.5 parts by weight of ground solid urea which passed through a U.S. No. 18 sieve and 3.1 parts by weight of water were fed into one end of a blunger, a conventional mixing device in which counter-rotating augers operate in a trough. When the urea slurry had formed, 3 parts by weight of soybean fatty acid grease was added and thorough mixing took place before the product reached the end of the blunger and was allowed to flow out the exit passage. The product left the blunger as a damp solid which was easily broken up, passed through a screen to remove any large lumps, and sent to the drying drum by conveyor. Oversize lumps from the drum dryer were passed through a grinder and recycled back to the drum dryer. By weighing up batches of the reactants, the blunger was kept running continuously at a rate of 325 parts by weight per hour. To keep the blunger operating clean and free from deposits adhering to the rotating mixing blades, about 3.5 parts by weight of dry finished product was recycled to the blunger for each 15 or 16 parts by weight of finished product. The finished product as it came from the dryer, having had any large lumps screened out, was packaged in this form. Residence time in the blunger subsequent to addition of fatty acids was 1 to 5 minutes. The blunger employed in the process had a trough 6 feet long, 12 inches wide at the top and 10 inches deep. The rotary dryer employed in this example was 18 inches in diameter and approximately 8½ feet long and was rotated at 7 revolutions per minute. The rate of air flow longitudinally through the dryer was between 100 and 200 feet per minute. Speed of drying may be improved by heating the air stream preferably to a temperature between about 45 and 55° C.

EXAMPLE 2

In another specific example, 40 parts of pulverized urea (60 percent through a U.S. No. 60 sieve) and 10 parts of water were mixed in a heavy duty Sigma type mixer for 1 to 3 minutes to obtain a uniform slurry Ten (10) parts of fatty acid grease (cottonseed or soybean) were added and mixing continued for two minutes At this point the solid adduct could readily be passed through a ⅛ inch screen for drying. Drying to less than 1 percent water was accomplished in a drum dryer with hot air (150–250° F.). By controlling the air and product temperature, a dry product was obtained without recycle or screening. Air flow and dryer speed were controlled to avoid excessive dust. These may vary with the dryer construction. However, air flow should approximate 100 feet per minute. Air temperatures should be controlled for maximum drying without softening the wet adduct sufficiently to cause agglomeration.

We claim:

1. In a process for manufacturing urea inclusion compounds of fatty substances selected from saturated and unsaturated fatty acids and esters in which a saturated aqueous solution of urea is employed as a reaction medium, the improvement consisting of performing the following steps in sequence:
   (a) mixing urea with sufficient water at ambient temperature to form a slurry but not sufficient to cause the major part of the urea to go into solution,
   (b) mixing under shearing conditions one part by weight of said fatty substance with a quantity of slurry from step (a) containing from 2.5 to 5.5 parts of urea for a time sufficient to form the solid urea inclusion compound, and
   (c) drying the product of step (b) in a stream of air, said steps (a) and (b) being performed without addition of heat to the process.

2. In a process for manufacturing a urea inclusion compound of a fatty acid in which an aqueous solution of urea is employed as a reaction medium, the improvement consisting of performing the following steps in sequence:
   (a) mixing each 40 parts by weight of pulverized urea with 10 parts of water under shearing conditions for 1 to 3 minutes to obtain a uniform slurry,
   (b) mixing 10 parts of fatty acid under shearing conditions with the slurry of step (a) for about 2 minutes, sufficient to form the solid urea inclusion compound, and
   (c) drying the product of step (b) in a drum dryer in a stream of air between 150 and 250° F. in temperature, flowing at about 100 feet per minute, said steps (a) and (b) being performed without adding heat to the process.

References Cited

UNITED STATES PATENTS

| | | | |
|---|---|---|---|
| 2,875,060 | 2/1959 | Holman | 99—2 F |
| 2,700,036 | 1/1955 | Bradley | 260—96.5 V |
| 2,985,641 | 5/1961 | Herrmann | 260—96.5 R |

FOREIGN PATENTS 665,248   1/1952   England.

OTHER REFERENCES

Progress in the Chemistry of Fats and Other Liquids pp. 243–265, 1954.

NORMAN YUDKOFF, Primary Examiner

H. H. BERSTEIN, Assistant Examiner

U.S. Cl. X.R.

99—2 ND, 2 F